W. W. McMAHAN & R. B. PRICE.
MANUFACTURE OF TIRES.
APPLICATION FILED APR. 21, 1913.
1,202,000.
Patented Oct. 17, 1916.
2 SHEETS—SHEET 2.
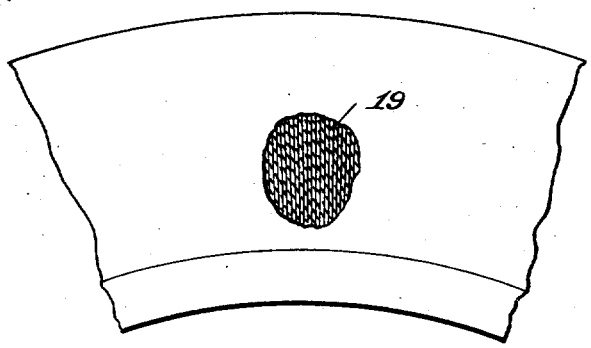
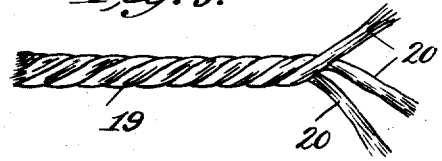
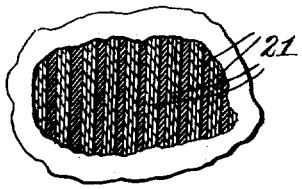
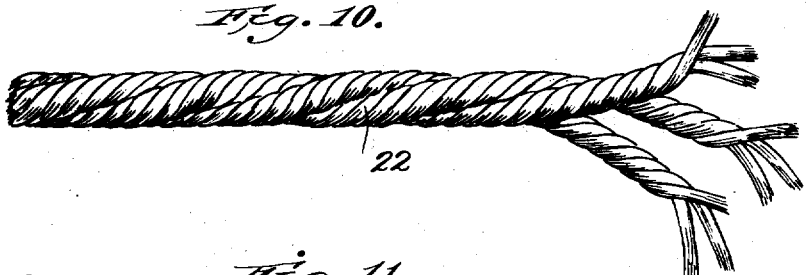
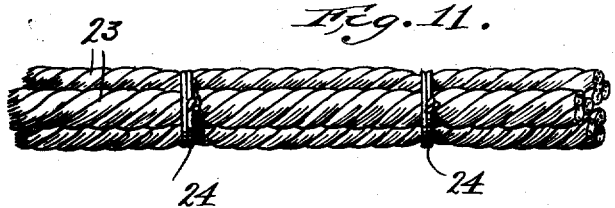
Witnesses
Edwin L. Jewell
A. L. Mills
Inventor
William W. McMahan
Raymond B. Price
by Percy B. Hills
Attorney

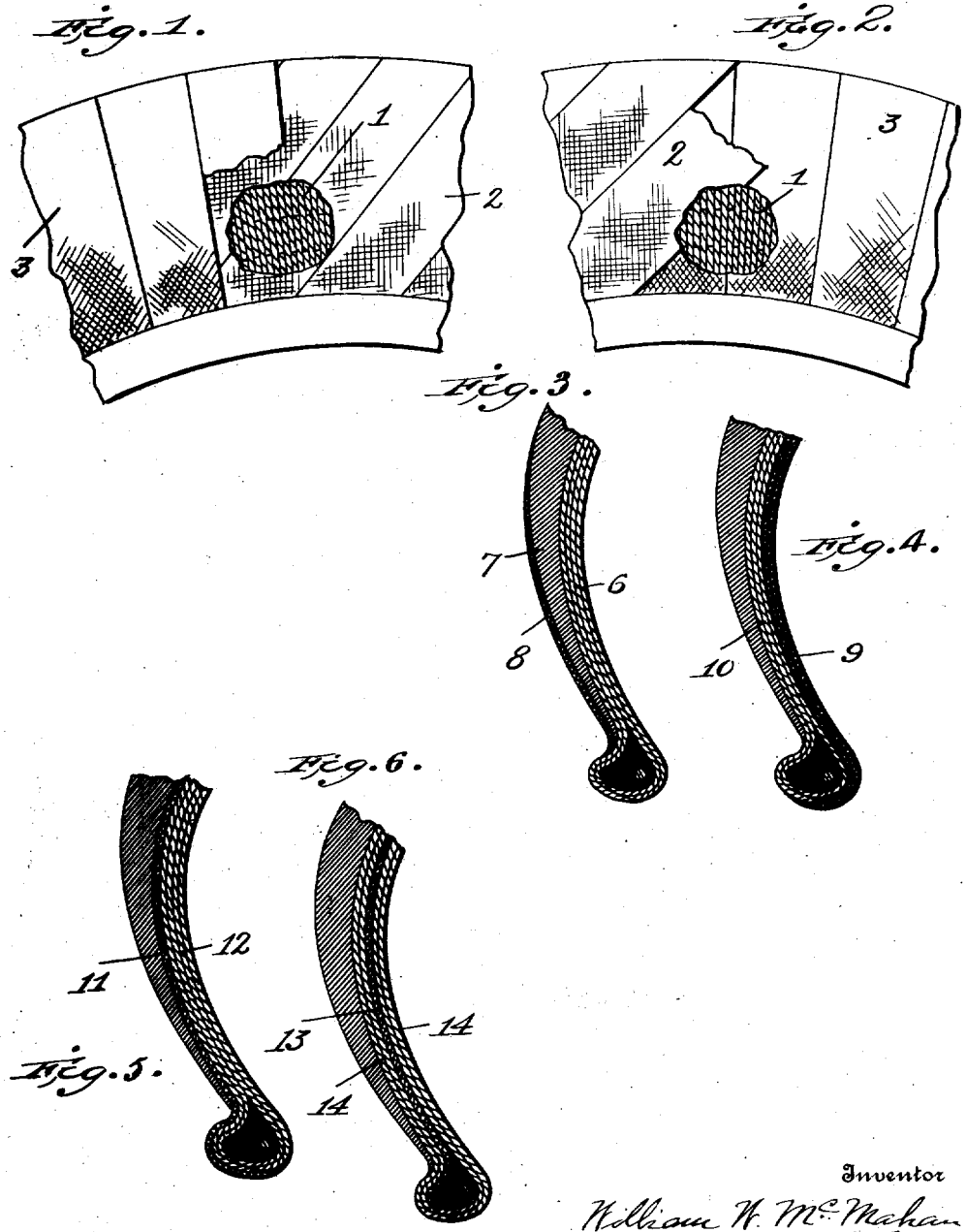

UNITED STATES PATENT OFFICE.

WILLIAM W. McMAHAN, OF DETROIT, MICHIGAN, AND RAYMOND B. PRICE, OF NEW YORK, N. Y., ASSIGNORS TO MORGAN & WRIGHT, A CORPORATION OF MICHIGAN.

MANUFACTURE OF TIRES.

1,202,000.  Specification of Letters Patent.  Patented Oct. 17, 1916.

Application filed April 21, 1913.  Serial No. 762,695.

*To all whom it may concern:*

Be it known that we, WILLIAM W. McMAHAN and RAYMOND B. PRICE, citizens of the United States, residing, respectively, at Detroit, in the county of Wayne, State of Michigan, and in the borough of Manhattan, city of New York, State of New York, have invented new and useful Improvements in the Manufacture of Tires, of which the following is a specification.

Our present invention relates to the manufacture of tire shoes, and has for its object to provide an improved construction of the same wherein the advantages obtained by the use of threads or thread fabric, disposed radially of the tire shoe, or both radially and diagonally, are obtained, at the same time minimizing certain disadvantages attendant upon the use of such construction.

In the accompanying drawings: Figure 1 is a side elevation of a portion of a tire shoe, the same being partly broken away to show the fabric construction. Fig. 2 is a similar view, showing a slightly modified construction. Figs. 3, 4, 5 and 6 are transverse sectional views of portions of tire shoes, showing different embodiments of our present invention. Figs. 7 and 8 are views similar to Fig. 1, showing still other modifications. Figs. 9, 10 and 11 are detail views of different forms of threads or cables.

In the said drawings, referring particularly to Fig. 1, the fabric or thread layers only are shown, the reference numeral 1 denoting an inner layer or layers of fabric composed of radially disposed cable laid warp threads bound together by weak weft or binder threads, superimposed upon which is a layer or layers 2 of the ordinary woven tire fabric commonly used in tire shoes, said fabric layer or layers being disposed diagonally or on the bias in the well known manner. On top of the fabric layer or layers 2 we dispose a layer or layers of fabric 3 like the fabric 2, but disposed radially. The ends of the cords and the edges of the fabric are disposed around beads which form common anchorages for the cords and fabric.

In Fig. 2 we have shown the inner layer or layers of radially disposed cable laid warp threads 1, as in Fig. 1, but with the layer or layers of fabric 2 and 3 transposed, the bias layer or layers 2 lying outside of the radial layer or layers 3. And we wish it to be understood that we contemplate dispensing with either of the layer or layers 2 or 3, using but one of them, and we also contemplate using one or a plurality of the layers 1, 2 or 3, reserving the right to vary the same as may be found desirable.

While we have shown the layer or layers of fabric 2 and 3 of comparatively narrow width in Figs. 1 and 2, we do not confine ourselves to any particular width for said layer or layers, as the same may be varied within the widest limits possible in tire construction.

In Fig. 3 we have shown a plurality of radially disposed inner layers 6 of cable laid threads like the layer or layers 1 of Fig. 1, and on the outside of the rubber 7 covering the same a layer of ordinary fabric 8, the same terminating preferably short of the tread, as shown.

In Fig. 4 are shown two inner layers 9 of ordinary fabric and a plurality of layers 10 of radially disposed cable laid threads; in Fig. 5 an outer layer 11 of ordinary fabric and a plurality of inner layers 12 of radially disposed cable laid thread; and in Fig. 6 a single layer 13 of ordinary fabric interposed between outer and inner layers 14 of radially disposed cable laid thread. With respect to all of these constructions, however, we contemplate any variation in the number of layers of the respective threads and fabrics, as, for instance, the employment of a plurality of layers of the ordinary fabric in conjunction with one or more layers of the cable laid thread, or any other variation as to the respective number of layers of the same.

The primary object of all of these constructions is to minimize any yielding or swaying of the tire shoe sidewise when in use, it having been found in practice that tire shoes made up of radially disposed threads alone, while possessing distinct advantages otherwise over tire shoes formed with plies of ordinary fabric, are more given to lateral yield, which it is desirable to minimize.

We have found that very satisfactory results can be obtained by employing, instead of cable laid threads, a one-ply thread, as shown at 19 in Fig. 7, and which may be employed, radially disposed as shown, in one or more layers, and in conjunction with a layer or layers of ordinary fabric, as in Figs. 1 and 2, and disposed in any of the ways shown or described in connection with Figs. 3 to 6. In Fig. 9 we have shown this one-ply thread in detail, the same being formed of the separate fibers 20 of the cotton twisted, as shown. And we contemplate the arrangement of said threads in slightly separated groups, as shown at 21 in Fig. 8. Or the said one-ply threads 19 may be loosely twisted into a cable 22, as shown in Fig. 10, or assembled in groups 23 untwisted and tied at intervals at 24, as shown in Fig. 11.

Having thus described our invention, what we claim as new and desire to secure by Letters Patent is:

1. A tire shoe embodying as the textile portion thereof radially disposed filamentary elements, diagonally disposed woven tire fabric holding the elements against side sway, and beads around which the terminals of the elements and the edges of the fabric are disposed.

2. A tire shoe embodying as the textile portion thereof radially disposed cable laid twisted cords, diagonally disposed woven tire fabric holding the cords against side sway, and beads around which the terminals of the cords and the edges of the fabric are disposed.

In testimony whereof, we have hereunto set our hands each in the presence of two subscribing witnesses.

WILLIAM W. McMAHAN.
RAYMOND B. PRICE.

Witnesses as to William W. McMahan:
   JOHN CARLSON,
   E. LA DUSCHEWSKY.
Witnesses as to Raymond B. Price:
   CHARLOTTE M. SCHULE,
   MAY V. SMITH.

Copies of this patent may be obtained for five cents each, by addressing the "Commissioner of Patents, Washington, D. C."